United States Patent [19]

Thornton

[11] 4,454,794
[45] Jun. 19, 1984

[54] TRUSS WEB SAW

[76] Inventor: Jack L. Thornton, P.O. Box 222400, Carmel, Calif. 93922

[21] Appl. No.: 373,190

[22] Filed: Apr. 29, 1982

[51] Int. Cl.³ .............................................. B27B 5/20
[52] U.S. Cl. .................................. 83/471.3; 83/486; 83/488; 83/581
[58] Field of Search .................... 83/471.3, 486, 488, 83/461, 581

[56] References Cited

U.S. PATENT DOCUMENTS

| | | | |
|---|---|---|---|
| 3,263,544 | 8/1966 | Margolien | 83/488 X |
| 3,386,322 | 6/1968 | Stone et al. | 83/488 |
| 3,413,881 | 12/1968 | Stolzer | 83/486 |
| 3,625,102 | 12/1971 | Shino | 83/488 X |
| 3,768,350 | 10/1973 | Coulter | 83/488 X |
| 3,851,557 | 12/1974 | Vierstraete | 83/461 X |
| 3,946,631 | 3/1976 | Malm | 83/471.3 |
| 4,036,093 | 7/1977 | Thorsell | 83/471.3 |

*Primary Examiner*—Donald R. Schran
*Attorney, Agent, or Firm*—Robert K. Rhea

[57] ABSTRACT

A power saw for rapid and repetitive accurate cutting of truss members on predetermined angles to insure tight fitting truss joints. The power saw is cycled vertically in a reciprocating mode and indexed at the limit of its respective up and downstrokes after being set at precise cutting angles. An adjustable saw indexing cylinder permits a wide range of web angle cuts. Workpiece clamps, mounted on a workpiece guide, coact with a web length stop to insure cutting webs of equal length and initiate the substantially automatic reciprocation and indexing of the saw acting on the workpiece.

9 Claims, 8 Drawing Figures

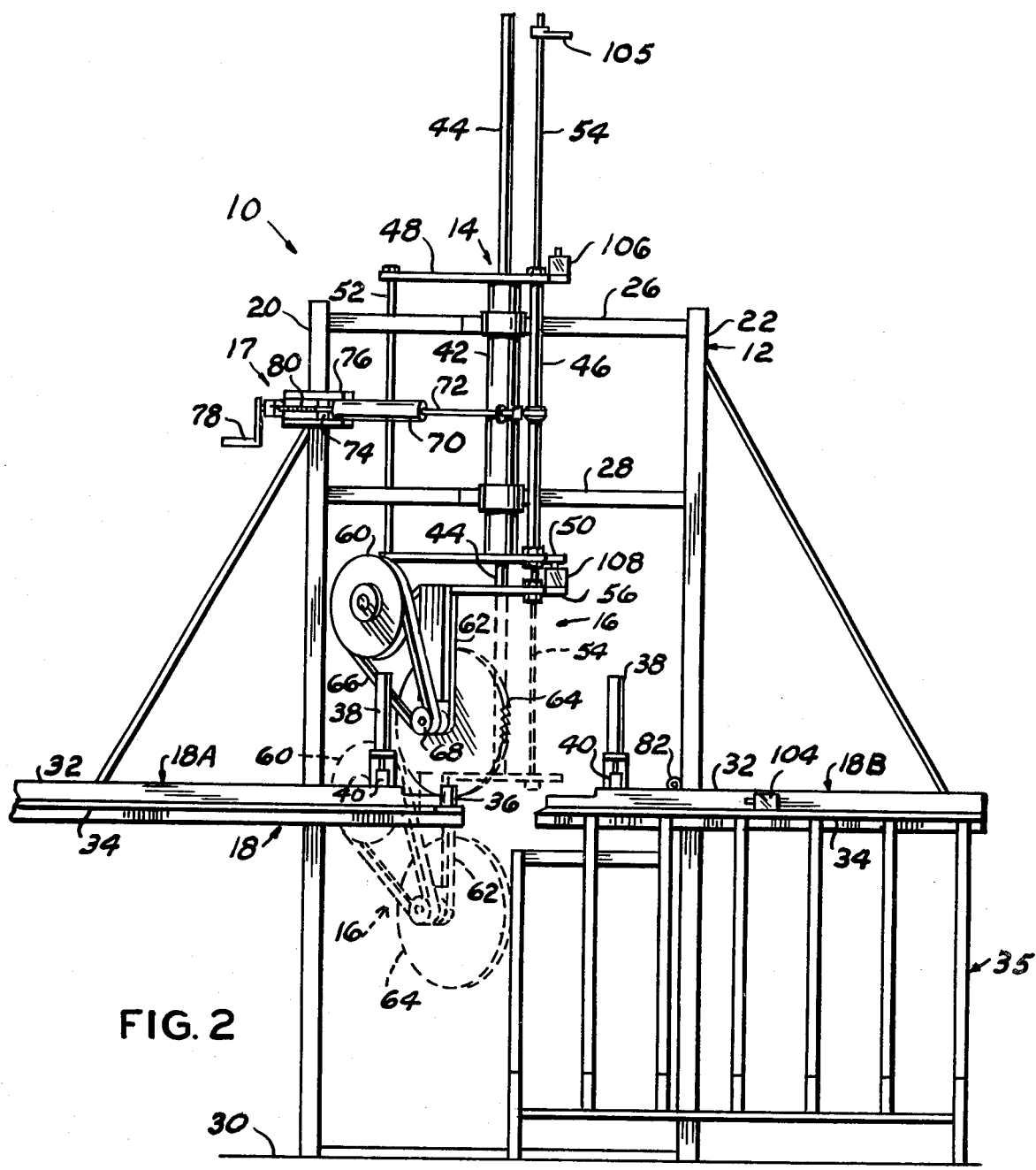
FIG. 1

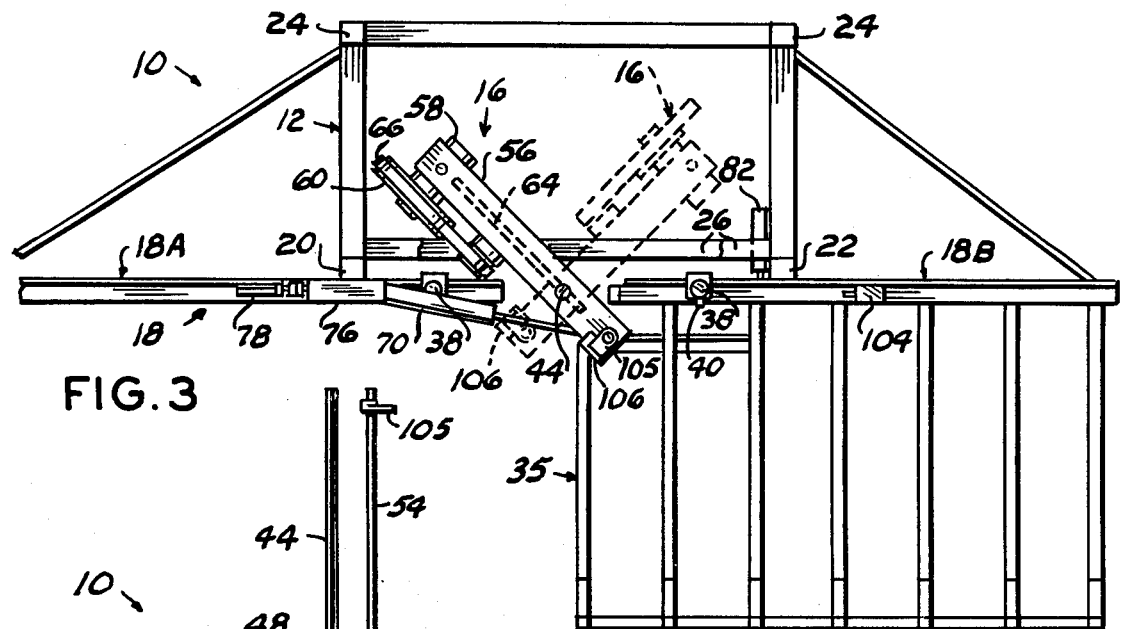
FIG. 3
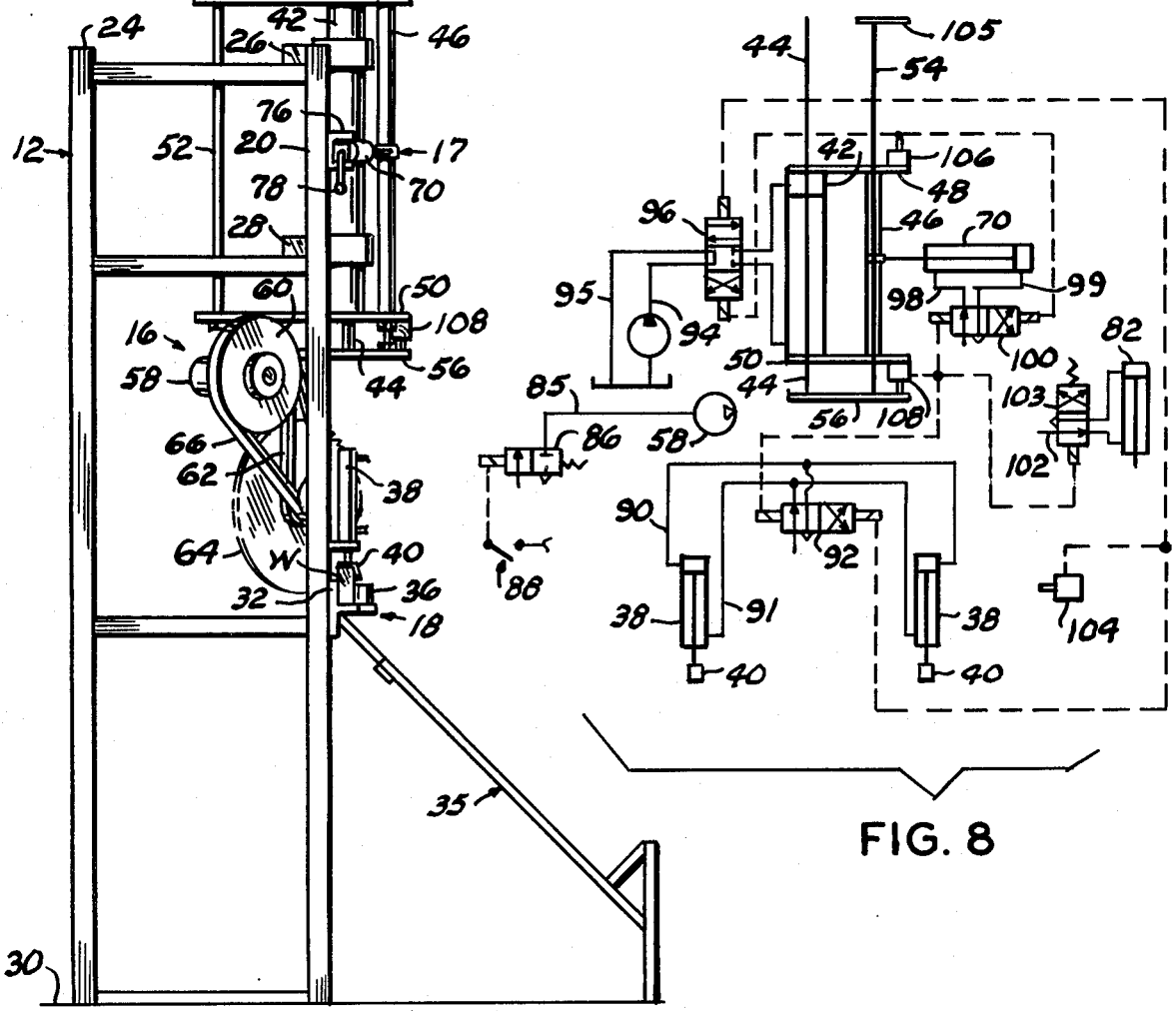
FIG. 4
FIG. 8

TRUSS WEB SAW

BACKGROUND OF THE INVENTION

1. Field of the Invention

The present invention relates to power saws and more particularly to an indexed reciprocating saw for cutting truss webs.

Unitized structural floor and roof trusses are frequently used when constructing wood buildings, such as barns, residences, garages, etc.. These trusses are constructed from dimensional lumber, such as 2×4's or 2×6's, wherein the truss members are joined by metal plates and it is necessary that predetermined dimensions and angles of cuts be maintained to insure tight fitting truss joints. Without such tight fitting joints the truss components flex under loads imposed thereon and sometimes fail as a result of the loss of strength.

2. Description of the Prior Art

It has been common practice to cut one angle on the ends of a plurality of truss webs with the saw set at the predetermined angle and pass the webs by the saw after indexing it to cut the companion angle on the respective truss web ends. Another method is to cut both angles on each end of the truss by indexing a miter-type saw following each cut. Either way requires at least one workman and is a time consuming operation frequently resulting in variations of the length of some of the webs with respect to companion webs.

The most pertinent prior art patent is believed U.S. Pat. No. 4,036,093 which discloses a power saw cycled vertically in a reciprocating mode after being set at a predetermined cutting angle relative to the workpiece which is maintained stationary by a work positioner and power workpiece clamp. The power saw is reciprocated by a pair of continuous running motors selectively clutch engaged manually with a threaded screw operatively connected with a power saw frame for lowering the power saw by one of the two motors and raising the power saw by the other one of the two motors.

This invention is distinctive over prior art web saws and the above named patent by providing a vertically reciprocating power saw operating on a workpiece clamped in a predetermined position in which the power saw may be set at predetermined cutting angles disposed in 90° relationship wherein the saw forms one of the web end cuts on its downstroke and the companion cut on its upstroke thus completing the 90° spaced angle cuts on adjacent ends of two webs cut from the workpiece.

SUMMARY OF THE INVENTION

An upright open framework horizontally supports a workpiece guide on its front. The front of the framework supports a double acting ram above the workpiece guide having the depending end of its piston rod connected with a circular saw support frame, having a saw driving motor thereon, operatively connected with a circular saw. A portion of the saw blade being in vertical alignment with the vertical axis of the ram which axis intersects a workpiece when supported by the workpiece guide. A saw indexing mechanism, comprising a tube coextensive with the ram and supported in parallel relation therewith by plates, at the ends of the ram, includes an elongated rod slidably projected through the tube and connected at its depending end with the saw frame. A pressure cylinder, adjustably secured to the framework, has its piston pivotally connected with the saw indexing tube for indexing the saw support frame 90° at the end of its up and down workpiece cut, respectively. A source of fluid pressure, including tubing, valves and limit switches forming a power saw control system, controls the web saw for substantially continuously cutting truss webs.

The principal objects of the invention are to provide a machine for automatically accurately cutting roof and floor truss components of a predetermined length in which the saw may be preset to cut predetermined angles, one angle cut on the downstroke of a saw blade and a companion angle cut at the same workpiece position on the upstroke of the saw blade thus forming cooperating finished cuts on opposing ends of the longitudinally alinged truss webs successively cut from a workpiece and in which the operation of the apparatus is substantially continuous.

BRIEF DESCRIPTION OF THE DRAWINGS

FIG. 1 is a perspective view of a substantially conventional truss web, per se;

FIG. 2 is a front elevational view of the truss web saw device illustrating, by dotted lines, the downward limit of saw movement;

FIG. 3 is a top view of FIG. 2;

FIG. 4 is a left end elevational view of FIG. 2;

DESCRIPTION OF THE PREFERRED EMBODIMENT

Figure 5:
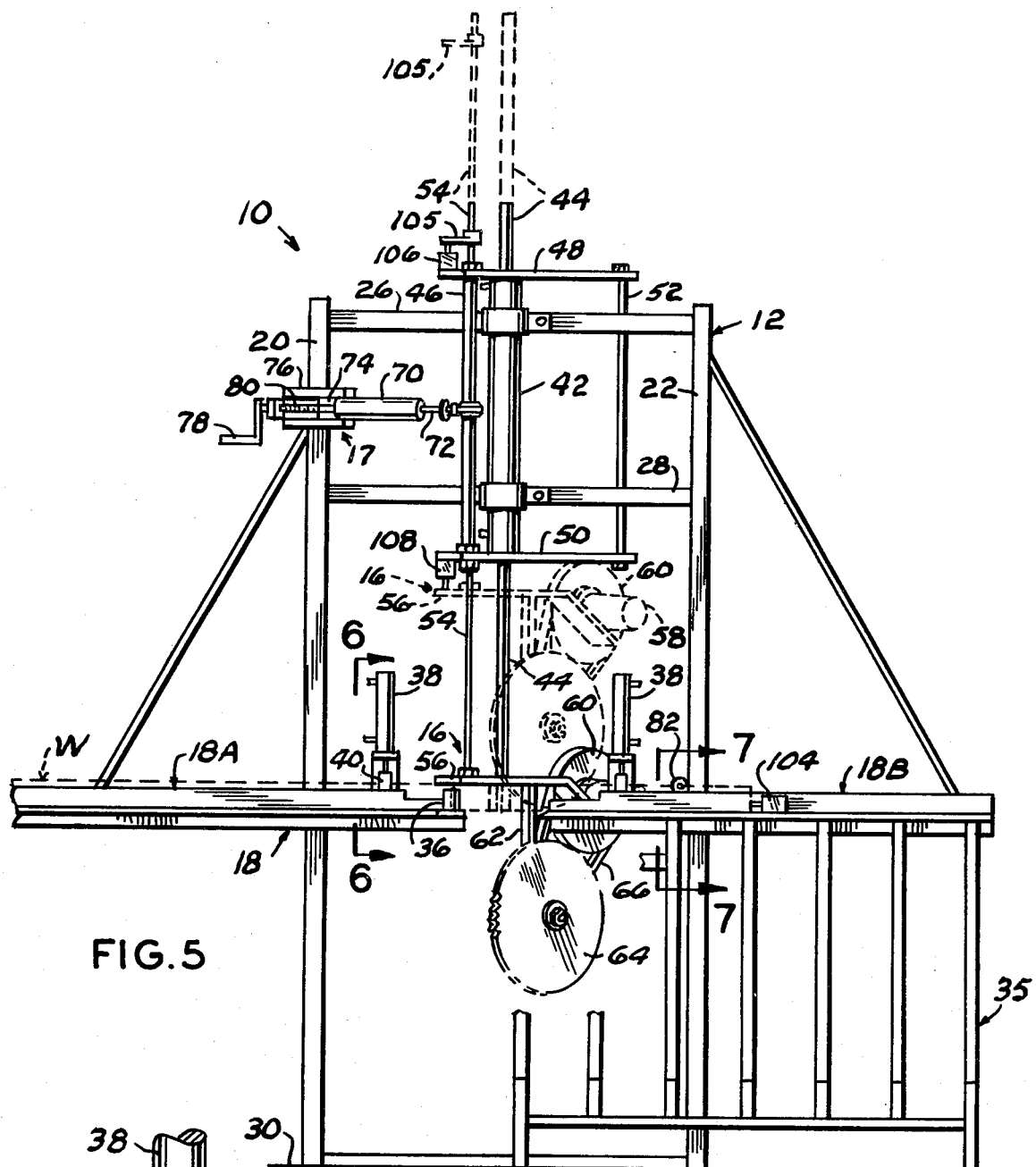
FIG. 5 is a view similar to FIG. 2 illustrating, by solid lines, the saw when indexed to the right from the dotted line position of FIG. 2 and illustrating, by dotted lines, the limit of the saw upstroke.
Figure 6:
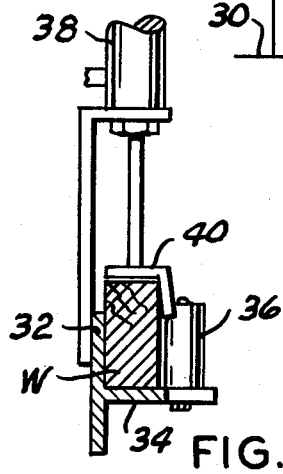
FIGS. 6 and 7 are fragmentary vertical cross sectional views, to a larger scale, taken substantially along the lines 6—6 and 7—7 of FIG. 5; and, FIG. 8 is a control diagram illustrating solenoid pilot control circuits by dash lines.
Figure 7:
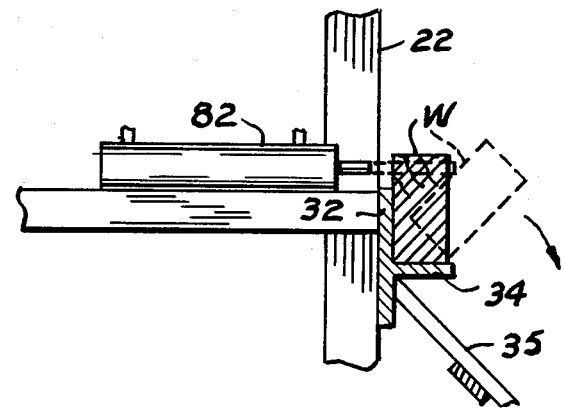

Like characters of reference designate like parts in those figures of the drawings in which they occur.

In the drawings:

The reference numeral 9 indicates a typical truss brace or web having cut surfaces A, B, C and D coextensive with the web width on its respective ends formed by the apparatus of this invention. The included angle between the end surfaces or angle cuts A—B and C—D is 90°. The cut A may be at 45° with respect to the longitudinal axis of the web, as shown, or be formed between 20° to 45° with its companion cut B formed between 45° to 70°.

The reference numeral 10 indicates the device, as a whole, comprising an open framework means 12, supporting ram means 14 operatively connected with power saw means 16, including indexing means 17, for moving the latter vertically relative to a framework supported workpiece guide means 18. The framework means 12 is rectangular upright, in the example shown, formed by forward corner posts 20 and 22 and rearward corner posts 24. The front of the frame means is characterized by a pair of vertically spaced horizontal cross members 26 and 28 secured to the rearward surfaces of the front posts 20 and 22 while other cross members interconnect the rearward posts 24 and connect them to the forward posts.

The workpiece support means 18 is formed by two sections, indicated at 18A and 18B, secured to the framework front posts 20 and 22, respectively, in horizontal aligned relation and at a predetermined height above the surface of the earth 30 or other support base for the device 10 with the sections 18A and 18B disposed in spaced-apart relation a selected distance medially the spacing between the framework front posts 20 and 22, defining a workpiece cutting station and for the passage of a saw blade, as presently explained. The workpiece guide and holding means 18 is formed from an elongated angle member having one of its flanges 32 flatly disposed against the front surface of the framework posts 20 and 22 with one leg 34 horizontally disposed for edgewise supporting an elongated workpiece W (FIGS. 4 and 5), the workpiece W being slidable longitudinally of the workpiece holding means 18. The workpiece W projects above the upper limit of the flange 32. The workpiece holding section 18A includes a guide roller 36 rollably contacting the surface of the workpiece W opposite the angle flange 32, for the purposes presently apparent. The workpiece guide or holding sections 18A and 18B respectively include one of a pair of workpiece clamp double acting pressure cylinders 38 vertically supported by the workpiece flange 32 adjacent the spacing between the sections. Each piston rod of the pressure cylinders 38 is connected with a workpiece aligning grip member 40 which respectively impinge spaced-apart portions of the workpiece W against the workpiece support flanges 32 and 34 when the pressure cylinder piston rods are extended. The finished workpieces 9 fall by gravity to a rack means 35 connected with the section 18B forwardly of the framework.

The ram means 14 comprises a vertically disposed ram 42 of selected length disposed in the plane of the front of the framework means 12 with its longitudinal axis intersecting the longitudinal axis of the workpiece W at the cutting station between the workpiece support sections 18A and 18B, for the purpose presently apparent. The ram includes a double end piston rod 44, projecting beyond the respective ends of the ram body, with its depending end secured to the power saw means 16. The ram means 14 further includes a portion of the power saw indexing means 17 formed by a tube 46 coextensive with the ram body and secured at its respective end portions by upper and lower index plates 48 and 50 overlying, intermediate their ends, the respective ends of the ram body around the piston rod 44 with the other ends of the plates opposite the tube 46, interconnected by a vertical rod 52 so that the indexing plates 48 and 50 may be horizontally pivoted through a predetermined arc about the vertical axis of the ram piston rod 44. The tube 46 longitudinally slidably receives an elongated guide rod 54 projecting beyond respective ends of the tube 46, through the plates 48 and 50, and rigidly secured at its depending end to the saw means 16.

The saw means 16 includes a saw frame comprising a generally horizontal bar 56 to which the ram piston 44 and guide rod 54 are connected at one of its end portions with its other end portion inclined downwardly and supporting a saw driving motor 58 having a pulley 60 on the motor drive shaft. Intermediate its connection with the ram piston 44 and the saw motor, the bar 56 is provided with a depending saw support or carrier arm 62 which journals, by its depending end portion, a circular saw blade 64 in parallel downward spaced relation with respect to the pulley 60. Power transmitting means, such as a belt 66, entrained around the pulley 60 and a driven pulley 68 on the arbor of the saw blade, drives the saw blade 64 when the motor 58 is operating. The diameter of the saw blade 64 is such that a portion of its periphery intersects the vertical axis of the ram piston rod 44 and intersects the longitudinal axis of the workpiece W to form intersecting angular cuts thereon as presently explained. The saw means 16 is suitably shielded by a guard means, not shown, for safety.

The indexing means 17 moves the vertical plane of the saw blade 64 horizontally through 90° at the limit of its downstroke to form a second or companion cut on its upstroke on one end of a truss web. The indexing means 17 further comprises an indexing pressure cylinder 70 having its piston rod 72 pivotally connected with the index tube 46 intermediate its ends with the base end of the pressure cylinder 70 pivotally connected to horizontally sliding blocks 74 longitudinally slidably mounted in a channel guide 76 horizontally secured to the framework post 20. The effective stroke of the piston rod 72 is, or is adjusted, such that, in combination with the horizontal spacing between the vertical axis of the ram piston rod 44 and guide rod 54, the saw frame means and saw blade is moved horizontally through an arc of 90° about the vertical axis of the ram piston rod each time the piston rod 72 is extended or retracted, as presently explained.

A hand crank 78, rotating a screw 80, connected with the sliding blocks 74, longitudinally adjusts the base end of the cylinder 70 relative to the channel guide 76 for angularly adjusting the plane of the saw blade relative to the axis of the workpiece W. Obviously, a degree scale or indicia, not shown, may be scored on the guide 76 to indicate angular positions of the saw blade relative to the longitudinal axis of the workpiece W.

A workpiece discharge pressure cylinder 82 is mounted adjacent the frame post 22 rearwardly of the workpiece section 18B for pushing the finished web 9 off the flange 34 toward the rack means 35.

Referring more particularly to FIG. 8, the control valves illustrated are the single winding solenoid actuator type. The saw driving motor 58 is connected with a source of fluid under pressure by tubing 85 through a control valve 86, the control valve being opened by an on/off switch 88 connected with a source of electrical energy, not shown. The clamp cylinders 38 are connected with a source of fluid under pressure by tubing 90 and 91 through a control valve 92. The ram cylinder 42 is connected with a hydraulic pump or fluid pressure source by tubing 94 and 95 through a control valve 96. The indexing cylinder 70 is connected with the fluid pressure source by tubing 98 and 99 through a control valve 100. The workpiece ejecting cylinder 82 is connected with the fluid pressure source by tubing 102 through a control valve 103. A pilot switch 104, forming a web length stop and fluid pressure pilot, is mounted on the work holding section 18B in a selected position to be actuated by the adjacent end of the workpiece W when moved longitudinally of the workpiece table or guide means 18 into contact with the switch 104 for initiating the sawing sequence, as presently explained.

Similarly, index pilot control switches 106 and 108 are mounted on the respective upper and lower bars 48 and 50 for shifting control valves in sequence, as presently explained.

Operation

Assuming the stop switch 104 is positioned for the desired web length and that the indexing cylinder 70 has been adjusted by operating the crank 78 so that extension and retraction of the indexing cylinder piston rod 72, disposes the plane of the saw blade on the predetermined angles so that the cuts A—B and C—D will be as desired for the truss to be formed. In its start position, the apparatus 10 is in the position shown by solid lines (FIG. 2). The saw driving motor 58 is started by closing the switch 88 to shift its valve 86 and continuously drive the saw blade 64. The workpiece W is positioned on the workpiece section 18A and then moved longitudinally until its leading edge contacts and closes the switch 104. Obviously, a conveyor means, not shown, may be employed to feed workpieces W to the workpiece guide means 18. Closing the pilot switch 104 shifts the clamp cylinder valve 92 to clamp the workpiece W on the workpiece guide or holding sections 18A and 18B while simultaneously shifting the ram control valve 96 to lower the saw means 16 to its dotted line position of FIG. 2 thus cutting the workpiece on a desired angle. When the saw reaches the limit of its downward travel (FIG. 2) a lug 105, on the upper end portion of the rod 54, closes the pilot switch 106 to shift the indexing cylinder valve 100 and index the saw 64 90° to the solid line position of FIG. 4. Closing pilot switch 106 simultaneously shifts the ram valve 96 to lift the saw to its dotted line position of FIG. 4 thus forming a second companion cut through the workpiece. When the saw reaches its dotted line position of FIG. 4, the saw support bar 56 closes the pilot switch 108 which shifts the indexing cylinder valve 100 to index the saw means 16 to its solid line position of FIG. 2. Closing the pilot switch 108 simultaneously shifts the clamp cylinder valve 92 to retract the pistons of the clamp cylinders 38 and release the workpiece while simultaneously shifting the ejection cylinder 82 control valve 103 to force the finished web 9 to fall by gravity on the rack means 35, thus completing one cycle of operation.

Obviously the invention is susceptible to changes or alterations without defeating its practicability. Therefore, I do not wish to be confined to the preferred embodiment shown in the drawings and described herein.

I claim:

1. A power saw for automatically cutting truss members, comprising:
    upright frame means having a front;
    ram means including a ram having a double end piston rod vertically mounted on the front of said frame means;
    power saw means including a power driven saw mounted on the depending end of said piston rod for vertical reciprocal movement therewith;
    guide means horizontally mounted on the front of said frame means for holding an intermediate portion of a workpiece in the path of vertical movement of said saw;
    indexing means connected with and operated by said power saw means for automatically turning said power saw means about the vertical axis of said piston rod between predetermined angular limits with respect to the horizontal axis of said guide means at the respective upper and lower limits of movement of said piston rod; and,
    control means including valves and tubing connected with a source of fluid pressure for continuously operating said ram means and said indexing means in sequence in response to movement of a workpiece in one direction.

2. The apparatus according to claim 1 in which said guide means slidably receives longitudinally an elongated workpiece and includes:
    a pair of elongated guide sections disposed in longitudinally aligned spaced-apart relation for the passage of said saw and defining a cutting station intersected by the vertical axis of said piston rod and a workpiece extending between said guide sections.

3. The apparatus according to claim 2 in which said guide means further includes:
    a workpiece clamp on at least one of said guide sections above a workpiece when supported thereon and operable to clamp a workpiece to said guide section during the cutting thereof by the saw means.

4. The apparatus according to claim 3 in which said control means further includes:
    actuator means adjustably mounted on one said guide section for limiting longitudinal movement of a workpiece relative to said one guide section and actuating said ram means.

5. The apparatus according to claim 4 in which said indexing means includes:
    means mounting a rod to said ram means in parallel spaced relation for vertical reciprocation with said piston rod,
    the depending end of said rod being secured to said saw means,
    said rod being angularly movable horizontally in opposing directions through a predetermined arc of a circle having the vertical axis of the piston rod as its center.

6. The apparatus according to claim 5 in which said mounting means further includes:
    a tube coextensive with said ram and surrounding an intermediate portion of said rod; and,
    plate means connecting the respective ends of said tube with the respective ends of said ram.

7. The apparatus according to claim 6 in which said indexing means further includes:
    an indexing cylinder mounted on said frame means and connected with said tube for moving said saw means.

8. The apparatus according to claim 7 in which said indexing means further includes:
    index switch means operatively mounted at the respective ends of said tube for actuating said indexing cylinder in response to said saw means reaching the limit of the piston rod upstroke and downstroke, respectively.

9. The apparatus according to claim 1 or 8 in which said saw means includes:
    a saw frame;
    a circular saw blade journalled on a horizontal axis by said saw frame so that the vertical axis of said piston rod subtends an arc of the periphery of said saw blade; and,
    motor means mounted on said saw frame for driving said circular saw.

* * * * *